(12) United States Patent
Nagase et al.

(10) Patent No.: US 6,718,275 B2
(45) Date of Patent: Apr. 6, 2004

(54) TRIMMING CIRCUIT FOR A PHYSICAL QUANTITY SENSOR

(75) Inventors: Kazuyoshi Nagase, Aichi-ken (JP); Hiroshi Nomura, Nagoya (JP)

(73) Assignee: Denso Corporation, Kariya (JP)

( * ) Notice: Subject to any disclaimer, the term of this patent is extended or adjusted under 35 U.S.C. 154(b) by 28 days.

(21) Appl. No.: 10/095,081

(22) Filed: Mar. 12, 2002

(65) Prior Publication Data

US 2002/0130650 A1 Sep. 19, 2002

(30) Foreign Application Priority Data

Mar. 19, 2001 (JP) ........................................ 2001-078865
Mar. 27, 2001 (JP) ........................................ 2001-090985

(51) Int. Cl.$^7$ ................................................. G11C 7/00
(52) U.S. Cl. ..................... 702/85; 365/189.12; 327/509
(58) Field of Search ............................... 702/85; 365/94, 365/96, 189.12; 327/509, 513, 516

(56) References Cited

U.S. PATENT DOCUMENTS 5,461,584 A   10/1995   Ikuta et al.

FOREIGN PATENT DOCUMENTS

| JP | 57-143656 | 9/1982 |
|----|-----------|--------|
| JP | 58-70497  | 4/1983 |
| JP | 62-192837 | 8/1987 |
| JP | 5-41483   | 2/1993 |
| JP | 5-307838  | 11/1993 |
| JP | 6-29555   | 2/1994 |
| JP | 9-283705  | 10/1997 |
| JP | 9-284266  | 10/1997 |

*Primary Examiner*—Kamini Shah
(74) *Attorney, Agent, or Firm*—Posz & Bethards, PLC (57) ABSTRACT

A trimming circuit includes a signal separation circuit for separating an input signal into a clock signal, a reset signal, a data signal, and a memory writing voltage signal in accordance with voltage levels. The memory circuit in the trimming voltage control circuit has at least first and second different error correction circuits. The first error correction circuit has a higher error correction capability but lower input-per-output bit efficiency than the second error correction circuit to correct important data such as a highest bit inputted to a D/A converter. The second error correction circuit such as SEC has a higher input-per-output bit efficiency than the first error correction circuit to correct data with an error correction code. The lowest or second lowest input bits are directly supplied to the D/A converter without error correction.

24 Claims, 10 Drawing Sheets

| A1 | A2 | A3 | Z |
|---|---|---|---|
| 0 | 0 | 0 | 0 |
| 1 | 0 | 0 | 0 |
| 0 | 1 | 0 | 0 |
| 0 | 0 | 1 | 0 |
| 0 | 1 | 1 | 1 |
| 1 | 0 | 1 | 1 |
| 1 | 1 | 0 | 1 |
| 1 | 1 | 1 | 1 |

FIG. 11 PRIOR ART

TRIMMING CIRCUIT FOR A PHYSICAL QUANTITY SENSOR

BACKGROUND OF THE INVENTION

1. Field of the Invention

This invention relates to a trimming circuit for a physical quantity sensor.

2. Description of the Prior Art

Figure 8:
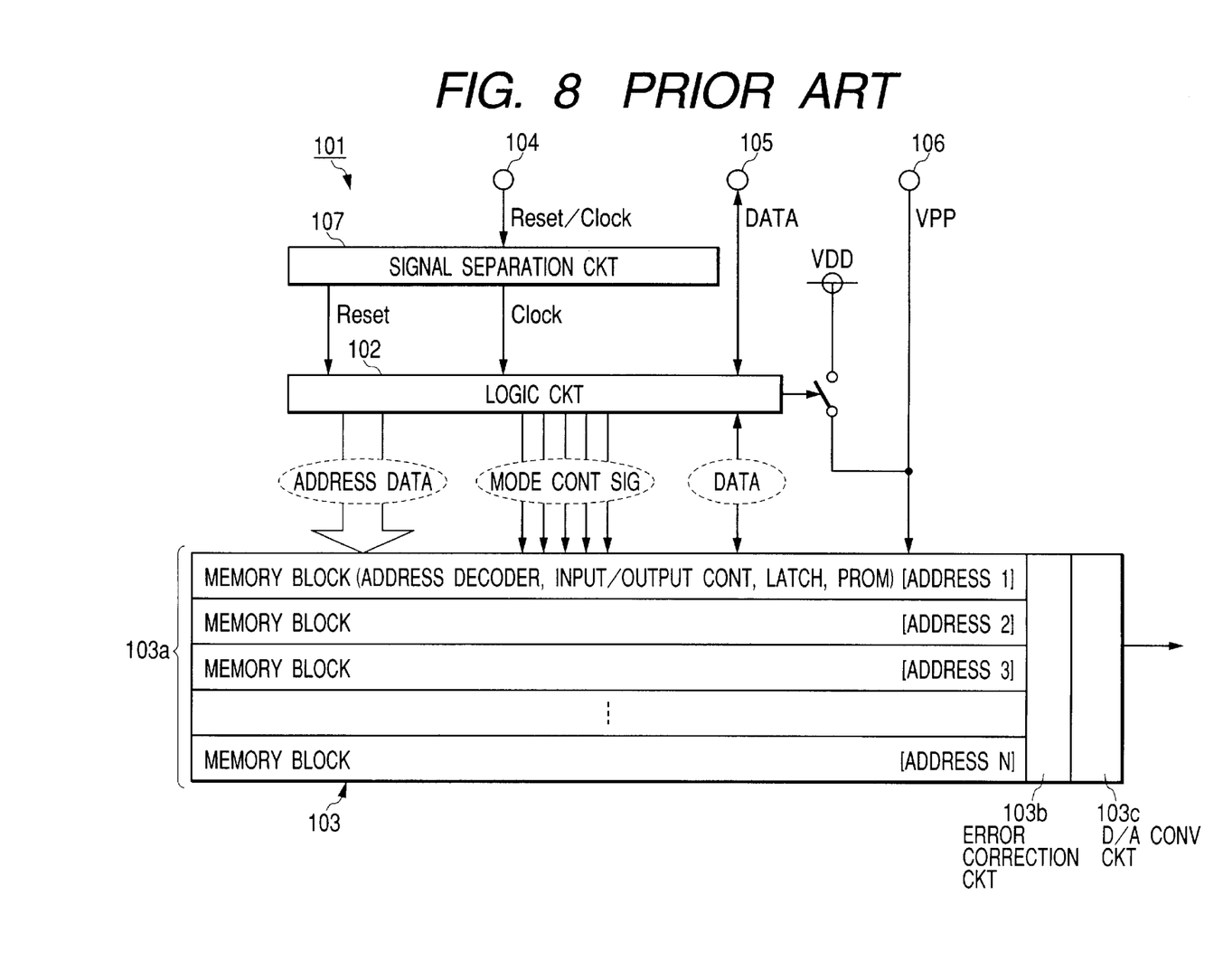
FIG. 8 is a block diagram of a prior art trimming circuit.

To reduce the number of input terminals of a trimming circuit for a physical quantity sensor, a signal separation circuit for separating control signals is used. FIG. 8 shows a prior art trimming circuit 101 for a physical quantity sensor. The trimming circuit 101 includes a logic circuit 102 for generating control signals on the basis of input signals, and a trimming voltage control circuit 103 for storing data on the basis of the control signals from the logic circuit 102 and generating trimming voltages for trimming the sensor outputs on the basis of the stored data. The trimming voltage control circuit 103 includes a plurality of memory blocks 103a, each having an address decoder, an input/output controller, a latch (volatile memory), and a PROM (non-volatile memory), an error correction circuit 103b for correcting the data stored in the memory, and a D/A converter 103c for converting the error-corrected output into an analog signal.

The trimming circuit 101 has three trimming signal input terminals 104 to 106. That is, the Clock/Reset terminal 104 inputs a Clock/Reset signal including a Clock signal and a Reset signal, the DATA terminal 105 inputs a DATA signal with logic Hi (=VDD) and Low (=GND) levels in phase with the clock signal, and the VPP terminal 106 inputs a high voltage VPP supplied to memories such as EPROM in the trimming voltage control circuit 103.

The trimming circuit 101 includes a signal separation circuit 107 for separating the Clock/Reset signal into the Clock signal and the Reset signal which are supplied to the logic circuit together with the DATA signal. The logic circuit 102 supplies address data, a mode control signal, and data corresponding to the DATA signal to the trimming voltage control circuit 103. The trimming voltage control circuit 103 generates trimming voltages for trimming the sensor output.

The high voltage VPP from the VPP terminal is supplied when data is written in the memory in the trimming voltage control circuit 103. On the other hand, while the writing operation is not effected, the supply voltage VDD is supplied to the trimming voltage control circuit 103 from a regulated voltage supply (not shown).

Figure 9:
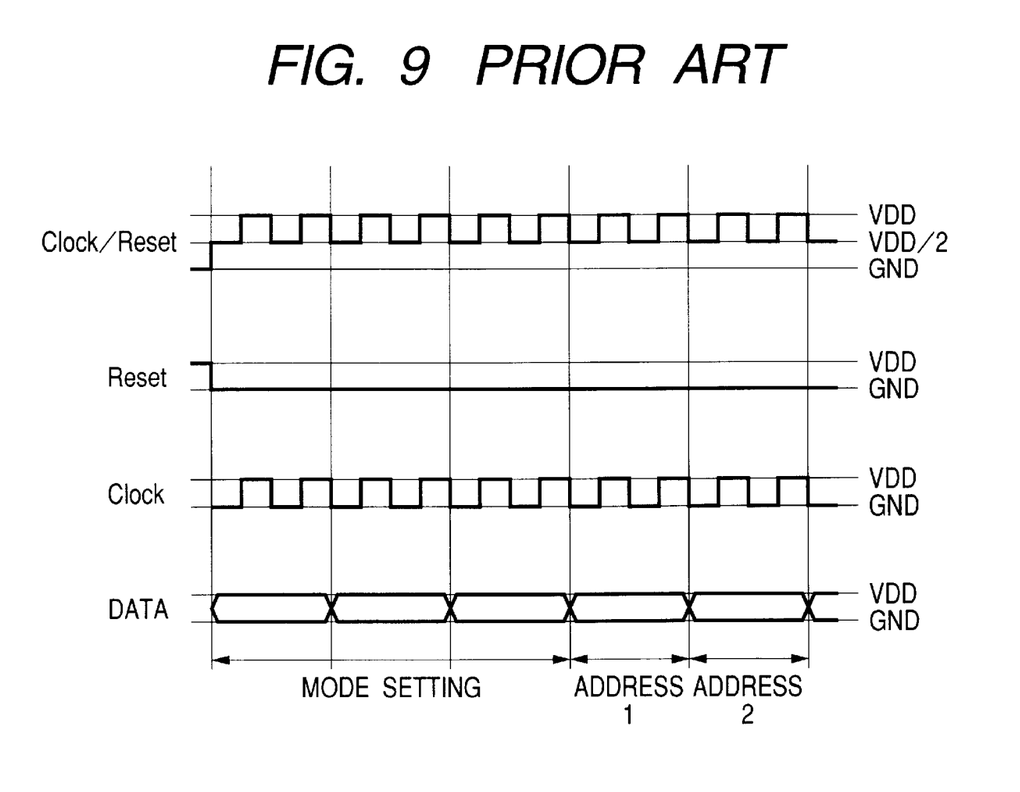
FIG. 9 is a time chart for the signal separation circuit in the prior art trimming circuit.

FIG. 9 shows a time chart of an example of the trimming of the physical sensor. Three voltage levels represent the Clock/Reset signal. The GND level represents resetting the logic circuit 102, a one-half of VDD represents the release of the resetting the logic circuit 102 and a logic Low level of the Clock signal, and the VDD level represents the release of the resetting the logic circuit 102 and a logic Hi level of the Clock signal. The DATA signal represents data with either of the Hi and Low logic levels. In response to the DATA signal, the logic circuit 102 successively makes temporarily storing data in the latch, reading data in the latch, writing the data in the PROM, and reading data in the PROM in the trimming voltage control circuit 103 on the basis of the DATA signal. Although the high voltage VPP signal is fixedly shown in FIG. 6, in fact, the high voltage VPP is supplied to the trimming voltage control circuit 103 only when data is written in the PROM.

This prior art trimming circuit 101 has three inputs in addition to the Vcc terminal, the GND terminal, and the Vout terminal 5. Thus, the reduction of the number of input terminals is further required.

Moreover, to correct an error in the data stored in the memory in the trimming circuit, a majority decision circuit is used.

Figure 10A:
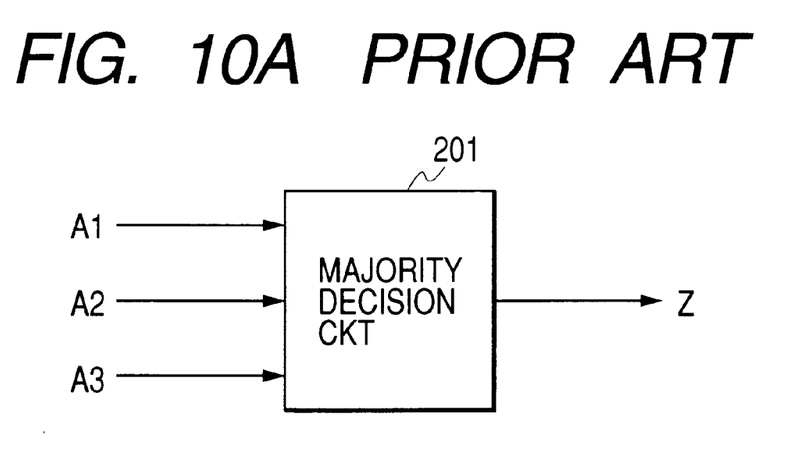
FIG. 10A is a block diagram of a majority decision circuit used in the prior art trimming circuit shown in FIG. 8.
Figure 10B:
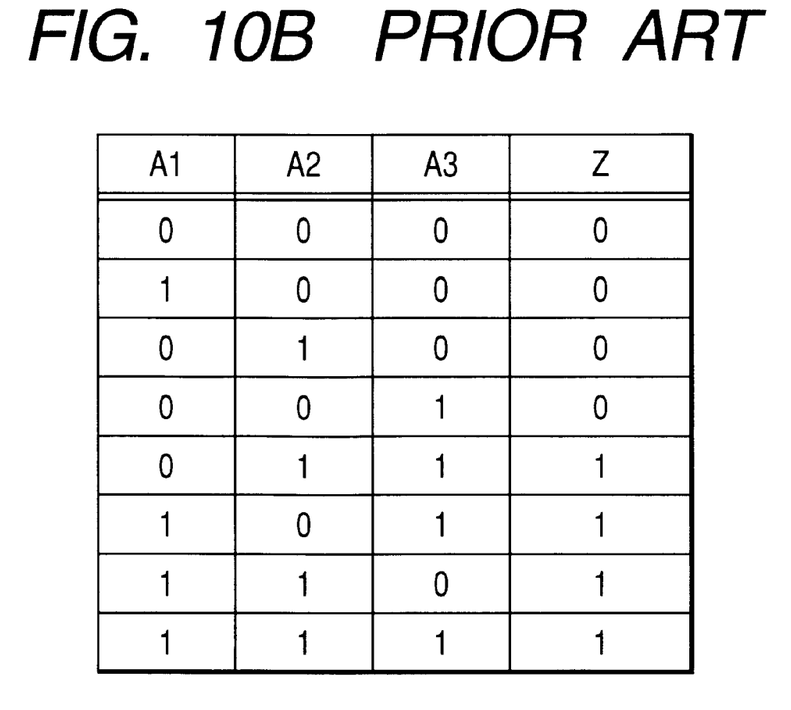
FIG. 10B is a truth table of the majority decision circuit shown in FIG. 10A.
Figure 11:
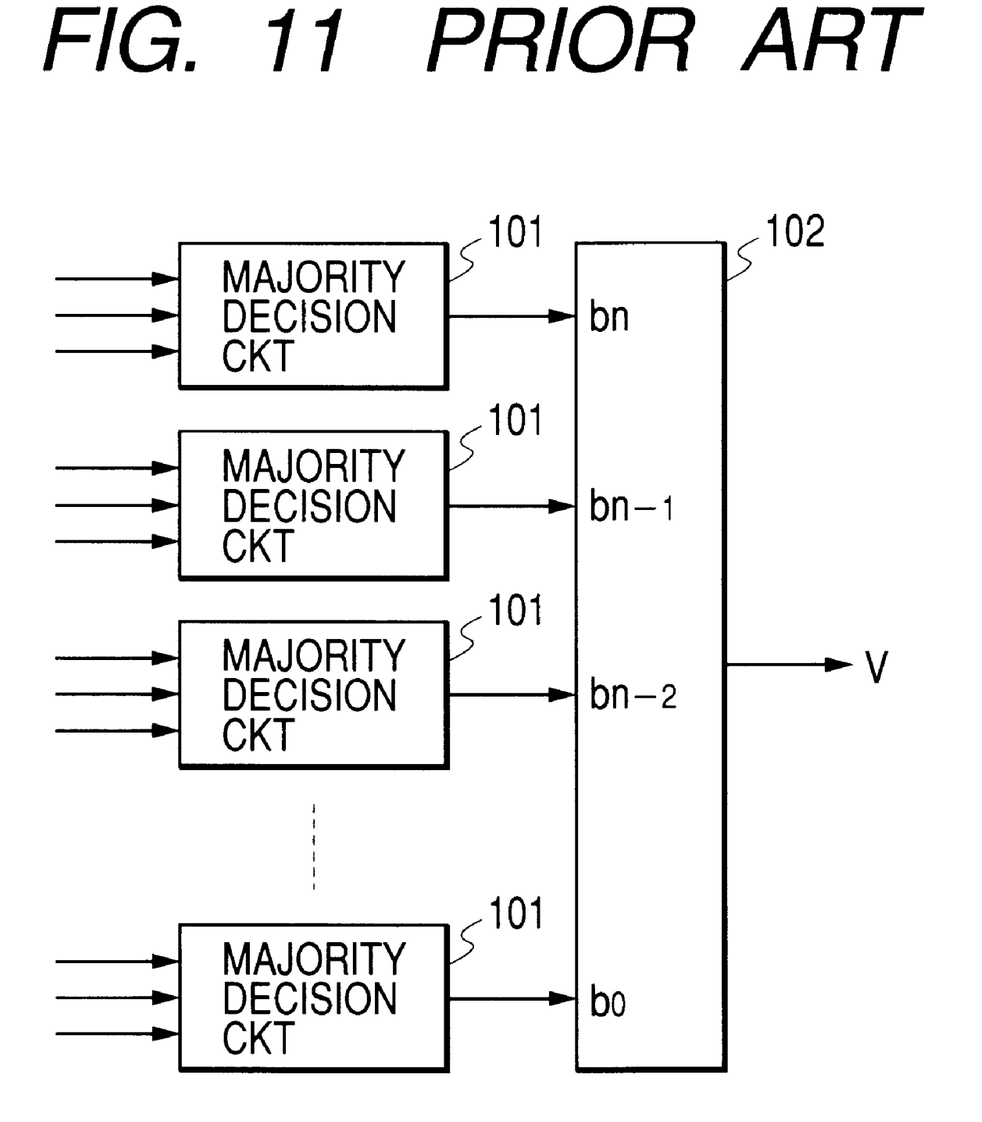
FIG. 11 is a block diagram of the error correction circuit in the prior art trimming circuit shown in FIG. 8.

FIG. 10A shows a prior art majority decision circuit 101 provided to the memory circuit. FIG. 10B shows a truth table of the majority decision circuit 201. On reading the memory, data A1, A2, and A3 of which values are to be the same are inputted to the majority decision circuit 201. When more than one pieces of the data indicate "1", the majority decision circuit 201 outputs "1". When more than one pieces of the data indicate "0", the majority decision circuit 201 outputs "0". Then, although one piece of the data is erroneously read or written, the data is corrected.

Each bit of output of the memories is subjected to the majority decision to provide a high reliability as shown in a prior art error correction circuit in FIG. 8.

However, the bit efficiency (the number of input bits per one output bit) in this circuit is low because a greater number of input bits are required. Thus, an error correction circuit having a higher bit efficiency is required in the trimming circuit.

SUMMARY OF THE INVENTION

The aim of the present invention is to provide a superior trimming circuit for a physical quantity sensor.

According to the present invention, a first aspect of the present invention provides a trimming circuit for a physical quantity sensor comprising:

an analog circuit for effecting at least one of an adjustment operation of a supply voltage to said physical quantity sensor and a trimming operation for an output voltage of said physical quantity sensor in accordance with a trimming value;

a trimming value control circuit having a memory circuit for storing data and generating said trimming value in accordance with said data from said memory;

a trimming signal input terminal for inputting a control signal including a clock signal, a reset signal, and said data as components;

a signal separation circuit for separating said clock signal, said reset signal, and said data from said control signal; and a logic circuit in response to said clock signal and said reset signal for supplying said data from said signal separation circuit to said trimming value control circuit and for receiving said data from said trimming value control circuit.

According to the present invention, a second aspect of the present invention provides a trimming circuit based on the first aspect, wherein said control signal further includes a writing voltage for said memory circuit as a component, and said signal separation circuit further separates said writing voltage from said control signal.

According to the present invention, a third aspect of the present invention provides a trimming circuit based on the first aspect, further comprising a power supply terminal for inputting a driving voltage for said physical quantity sensor, a ground terminal, and an output terminal for outputting a voltage signal corresponding to an output of said physical quantity sensor, and thus said trimming circuit having only four terminals.

According to the present invention, a fourth aspect of the present invention provides a trimming circuit based on the third aspect, further comprising a voltage generation means for generating a predetermined voltage level signal of which level is determined on the basis of said data from said logic circuit, and a switch response to said data for outputting either of said voltage signal or said predetermined voltage level signal, wherein said predetermined voltage level signal is distinguishable from said voltage signal.

According to the present invention, a fifth aspect of the present invention provides a trimming circuit based on the fourth aspect, wherein said power supply terminal, said ground terminal, and said output terminal are connected to said analog circuit, and said logic circuit includes a decoding circuit for decoding said data to generate mode setting data, address data, and control data, said logic circuit supplies said control data to said trimming value control circuit as said data in accordance with said mode setting data and address data, and wherein when said mode setting data indicates a predetermined voltage level signal outputting mode, said logic circuit receives said data from said memory circuit and supplies said received data to said analog circuit and controls said switch to output said predetermined voltage level signal at said output terminal on the basis of said data from said logic circuit.

According to the present invention, a sixth aspect of the present invention provides a trimming circuit based on the first aspect, wherein said control signal is represented with first to fourth voltages levels, said fourth level is higher than said third voltage level which is higher than said second voltage level which is higher than said first voltage level, and wherein said logic circuit effects a reset operation thereof in response to said first voltage level, effects a reset releasing operation thereof in response to said second voltage level, receives said second voltage level as a logic Low level of said clock signal and a logic Low level of said data, and effects said reset releasing operation of said logic circuit in response to said third voltage level, receives said third voltage level as a logic Hi level of said clock signal, and a logic Low level of said data, and effects said reset releasing operation of said logic circuit in response to said fourth voltage level, receives said fourth voltage level as said logic Hi level of said clock signal, and a logic Hi level of said data.

According to the present invention, a seventh aspect of the present invention provides a trimming circuit based on the second aspect, wherein said writing voltage is higher than a supply voltage for said signal separation circuit, said trimming voltage control circuit, and said logic circuit, and wherein said signal separation circuit includes first and second diodes for supplying either said supply voltage or said writing voltage, an anode of said first diode being connected to said trimming signal input terminal, a cathode of said first diode being connected to a voltage input of said trimming voltage control circuit, an anode of said second diode being supplied with said supply voltage, a cathode of said second diodes being connected to said voltage input of said trimming voltage control circuit.

According to the present invention, an eighth aspect of the present invention provides a trimming circuit based on the first aspect, wherein said memory circuit includes a plurality of memory blocks for storing said data including first and second data, each of said memory blocks including a memory; and said trimming value control circuit comprises:
 a first error correction circuit for error-correcting said first data from said memory circuit through a first error correcting method;
 a second error correction circuit for error-correcting said second data from said memory circuit through a second error correcting method, said first error correcting method being different from said second error correcting method; and
 a weighting circuit for weighting an output of said first error correction circuit with a first coefficient to output a first trimming value and an output of said second error correction circuit with a second coefficient to output a second trimming value, said first coefficient being higher than said second coefficient, said logic circuit supplying said first and second trimming values as said trimming value to said analog circuit.

According to the present invention, a ninth aspect of the present invention provides a trimming circuit based on the eighth aspect, wherein said first error correction circuit has a first input-per-output bit efficiency and said second error correction circuit has a second input-per-output bit efficiency which is higher than said first input-per-output bit efficiency.

According to the present invention, a tenth aspect of the present invention provides a trimming circuit based on the eighth aspect, wherein said first error correction circuit has a first error correcting capability, and said second error correction circuit has a second error correcting capability which is lower than said first error correcting capability.

According to the present invention, an eleventh aspect of the present invention provides a trimming circuit based on the eight aspect, wherein said first error correcting circuit comprises a majority decision circuit for making majority decision from said first data from a portion of said memory blocks.

According to the present invention, a twelfth aspect of the present invention provides a trimming circuit based on the eighth aspect, wherein said data includes error correction data, and said second error correction circuit error-corrects said second data from said memory circuit with said error correction data from said memory circuit.

According to the present invention, a thirteenth aspect of the present invention provides a trimming circuit for a physical quantity sensor comprising:
 a memory circuit including a plurality of memory blocks for storing data including first and second data, each of said memory blocks including a memory;
 a first error correction circuit for error-correcting said first data from said memory circuit through a first error correcting method;
 a second error correction circuit for error-correcting said second data from said memory circuit through a second error correcting method, said first error correcting method being different from said second error correcting method; and
 a weighting circuit for weighting an output of said first error correction circuit with a first coefficient to output a first trimming value for said physical quantity sensor and an output of said second error correction circuit with a second coefficient to output a second trimming value for said physical quantity sensor, said first coefficient being higher than said second coefficient.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

First Embodiment

Figure 1:
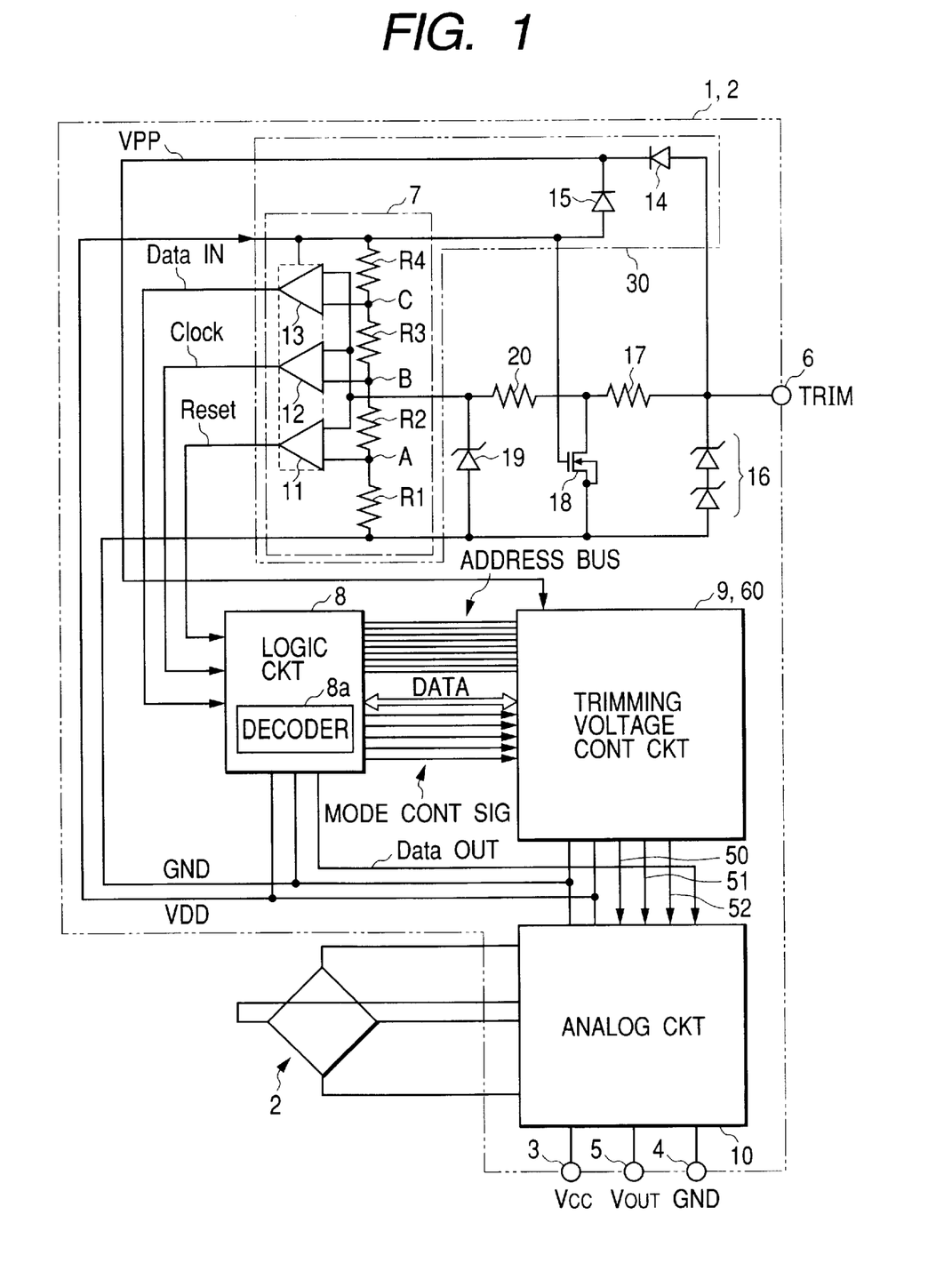
FIG. 1 is a block diagram of a trimming circuit for a physical quantity sensor according to this invention.
Figure 2:
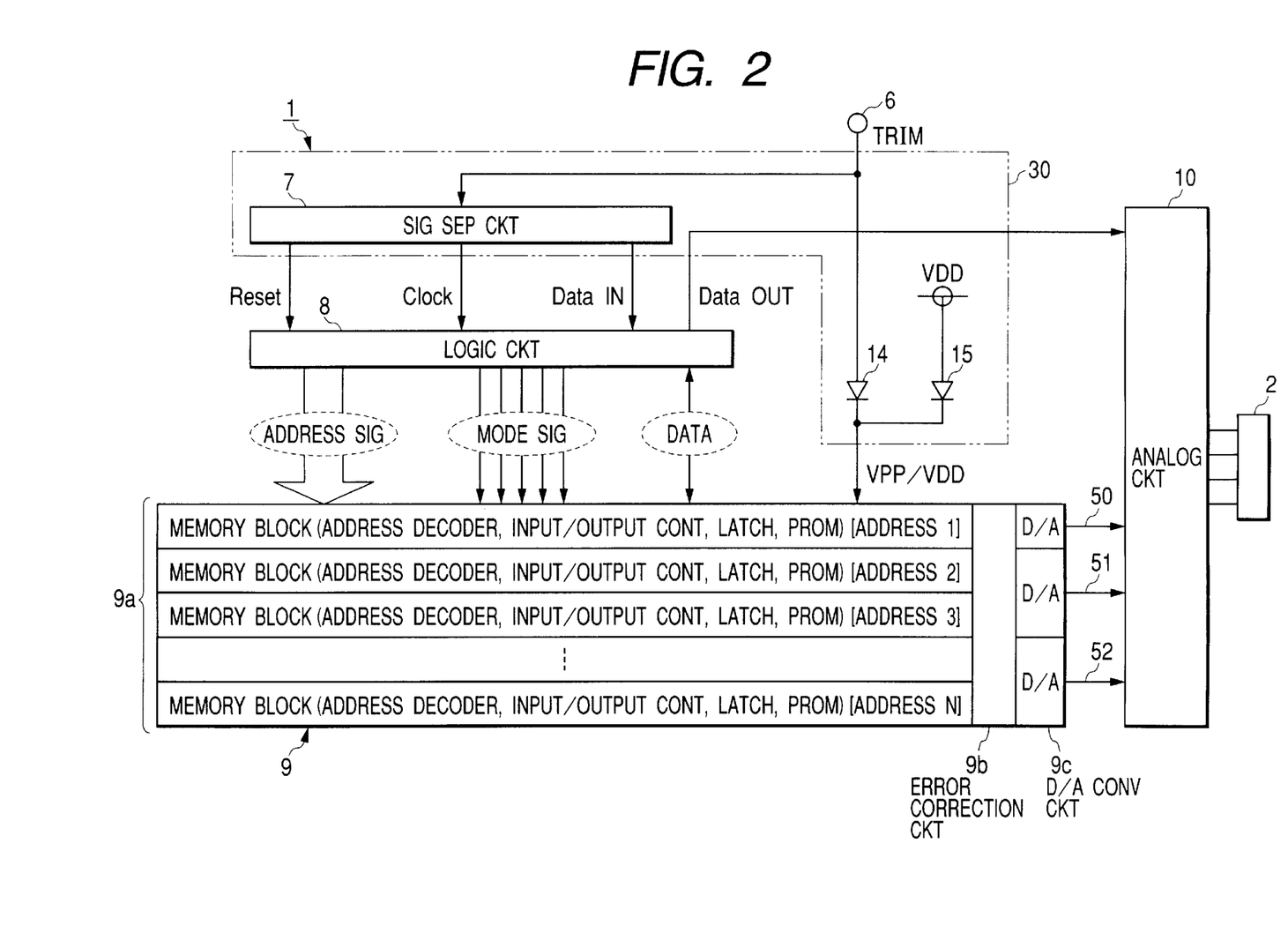
FIG. 2 is a block diagram of the trimming circuit according to the first embodiment.

FIG. 1 shows a trimming circuit 1 for a physical quantity sensor according to the first embodiment. FIG. 2 shows a block diagram of this trimming circuit.

The trimming circuit 1 for a physical sensor circuit 2 makes sensitivity trimming, offset adjustment, and offset temperature characteristic adjustment by trimming operations for the physical sensor circuit 2, which includes a bridge circuit (2) having piezoelectric resistive elements for example. The trimming circuit 1 has a Vcc terminal 3, a GND (grounding) terminal 4, a Vout terminal 5, and a TRIM terminal 6. Moreover, the trimming circuit 1 includes a signal separation circuit 30, a logic circuit 8, a trimming voltage control circuit 9, and an analog circuit 10.

The Vcc terminal 3 and the GND terminal 4 are provided for supplying power to the physical sensor circuit 2 and the trimming circuit. The Vout terminal 5 selectively outputs a voltage signal according to the output signal from the physical sensor circuit 2. The TRIM terminal 6 inputs a TRIM signal for trimming. The TRIM signal includes a Clock/Reset signal, a DATA signal representing data with a logic Hi level (=VDD) and a logic Low (=GND) level, and a high voltage VPP supplied to memories such as EPROM or the like in a trimming voltage control circuit 9 (mentioned later).

The control signal separation circuit 7 separates the inputted TRIM signal into the Clock signal, the Reset signal, and a Data IN signal. In other words, the TRIM signal includes components of the Clock signal, the Reset signal, and the Data IN signal, and the control signal separation circuit 7 extracts components of the Clock signal, the Reset signal, and the Data IN signal from the TRIM signal.

The logic circuit 8 is supplied with these signals from the control signal separation circuit 7.

For example, the control signal separation circuit 7 includes four voltage dividing resistors R1 to R4 connected in series, and three comparators 11 to 13 for comparing voltages at the junction points in the four voltage dividing resistors R1 to R4 with the voltage of the TRIM signal. The comparator 11 extracts the Reset signal. The comparator 12 extracts the Clock signal. The comparator 13 extracts the Data IN signal.

The logic circuit 8 effects various controls on the basis of the data separated by the control signal separation circuit 7. More specifically, the logic circuit 8 includes a decoder 8a which supplies address data and a mode control signal to the trimming voltage control circuit 9. Moreover, the logic circuit 9 sends the data to and receives data from the trimming voltage control circuit 9 and supplies the data received from the trimming voltage control circuit 9 as a Data OUT signal to the analog circuit 10.

The trimming voltage control circuit 9 controls trimming values. That is, the trimming voltage control circuit 9 stores data for the trimming operation on the basis of the control signals from the logic circuit 8 and generates trimming voltages (trimming values) for trimming the sensor output on the basis of the stored data.

As shown in FIG. 2, the trimming voltage control circuit 9 includes a plurality of memory blocks 9a, each having an address decoder, an input/output controller, a latch (volatile memory), and a PROM (non-volatile memory), an error correction circuit 9b for correcting the data stored in the memory, and a D/A converter 9c for converting the error-corrected output into an analog signal. In the trimming voltage control circuit 9, one of the memory blocks 9a is selected on the basis of an address included in the address data from the logic circuit 8, and either of the latch or the PROM is controlled on the basis of the mode control signal. Moreover, one of the operation modes from writing data in a memory and reading data from the memory is selected and set on the basis of the data.

Moreover, the trimming voltage control circuit 9 is supplied with the high voltage VPP through the TRIM terminal 6 on writing data in a memory. During the writing operation, the high voltage VPP is supplied to the trimming voltage control circuit. On the other hand, while the high voltage VPP is not supplied, the supply voltage VDD is supplied to the trimming voltage control circuit 9. Then, a diode 14 is provided between the TRIM terminal 6 and the trimming voltage control circuit 9. The diode 14 can flow a relatively large magnitude of current. In addition, the supply voltage VDD is supplied to the trimming voltage control circuit 9 through a diode 15. Therefore, on writing data in a memory, the high voltage VPP is supplied to the trimming voltage control circuit 9, and during the other operations, the supply voltage VDD is supplied from a regulated voltage source in the analog circuit 10 to the trimming voltage control circuit 9.

The diodes 14 and 15, and the above-mentioned control signal separation circuit 7 form a signal separation circuit 30 which separates the TRIM signal into controls signals and the high voltage VPP.

The analog circuit 10 is connected to the Vcc terminal 3, the GND terminal 4, and the Vout terminal 5 to be connected to an external circuit. The analog circuit 10 adjusts voltages applied to the physical sensor circuit 2 and adjusts the output from the physical sensor circuit 2 on the basis of trimming voltages from the trimming voltage control circuit 9. Those trimming operations provide final adjustments in the sensitivity, the offset voltage, and the offset temperature characteristic. Moreover, the analog circuit 10 selectively generates an output corresponding to the data stored in the memory in the trimming voltage control circuit 9.

In FIG. 1, zener diodes 16 are connected between the TRIM terminal 6 and the GND line to provide electrostatic protection. The resistor 17 is provided for input protection. The MOSFET 18 acts as a pull-down resistor. The zener diode 19 clamps an excessive voltage such as noise from the TRIM terminal 6. The resistor 20 controls the clamping current.

Trimming Operation

Figure 3:
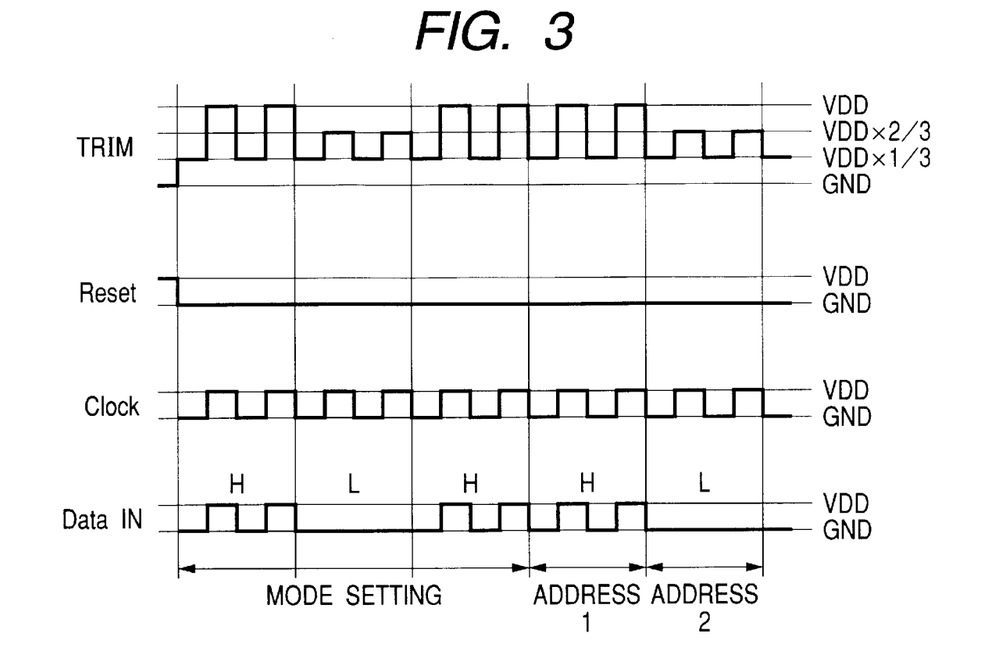
FIG. 3 is a time chart for the signal separation circuit according to the present invention.
Figure 4:
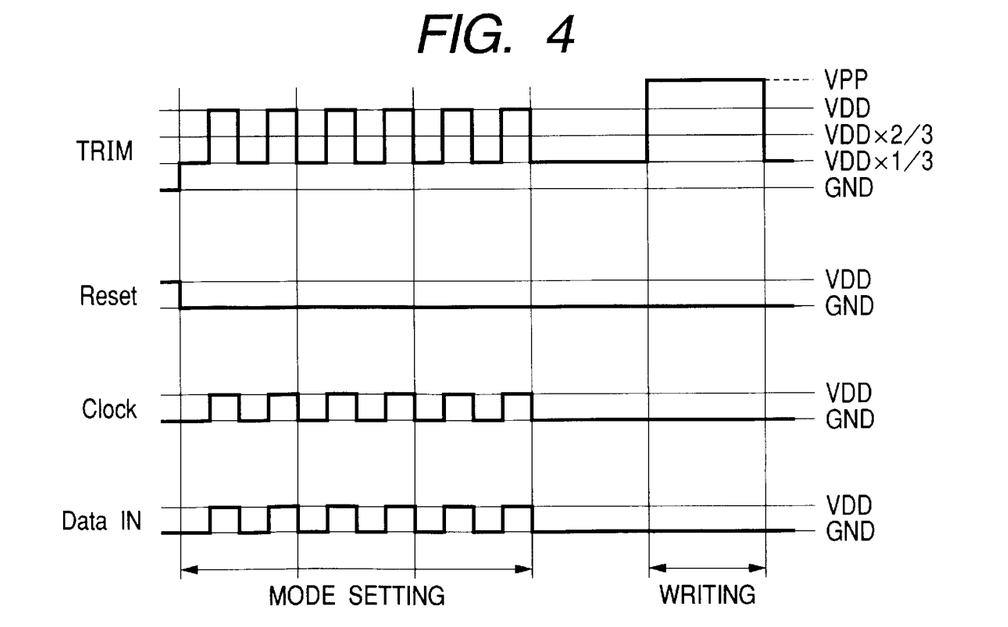
FIG. 4 is another time chart for the signal separation circuit according to the present invention.

FIGS. 3 and 4 show time charts in the trimming operation.

The TRIM signal is represented with five different voltage levels. That is, the GND level, a one-third of VDD level, a two-thirds of VDD level, the VDD level, and the VPP level. The GND level represents resetting of the logic circuit 8. The one-third of VDD level represents the releasing of resetting the logic circuit 8 and the logic Low level of the Clock signal. The two-thirds of VDD level represents the releasing of resetting the logic circuit 8 and the logic Hi level of the Clock signal, and the logic Low level of the data. The VDD level represents the releasing of resetting the logic circuit 8 and the logic Hi level of the Clock signal, and the logic Hi level of the data. The VPP is supplied to the memory in the trimming voltage control circuit 9 in the writing operation.

Thus, transition of the TRIM signal from the GND level to the one-third of VDD level releases the resetting. Transition of the TRIM signal to a level higher than the one-third of VDD level makes the Clock signal to the logic Hi level. In phase with the Clock signal, the Data IN signal represents the logic Low level when the TRIM signal is at the two-thirds of VDD level and represents the logic Hi level when the TRIM signal is at the VDD level.

The logic circuit 8 generates the mode setting signal on the basis of the Data IN signal extracted from the TRIM signal, and then, decides whether the operation indicated by the mode setting signal is to be made for each address, that is, each of memory blocks 9a. If the logic circuit 8 decides that the operation in the mode is effected to one of the addresses, the operation is effected only to the memory block having the address. Thus, when the mode indicates the memory writing, the logic circuit 8 determines the address and makes the writing operation to the memory block with the high voltage VPP. More specifically, for example, when "1" is written in a latch in the memory block indicated by the address, the memory accompanying the latch storing "1" is written with the writing voltage, i.e., the high voltage VPP which is higher than the supply voltage VDD.

Figure 5:
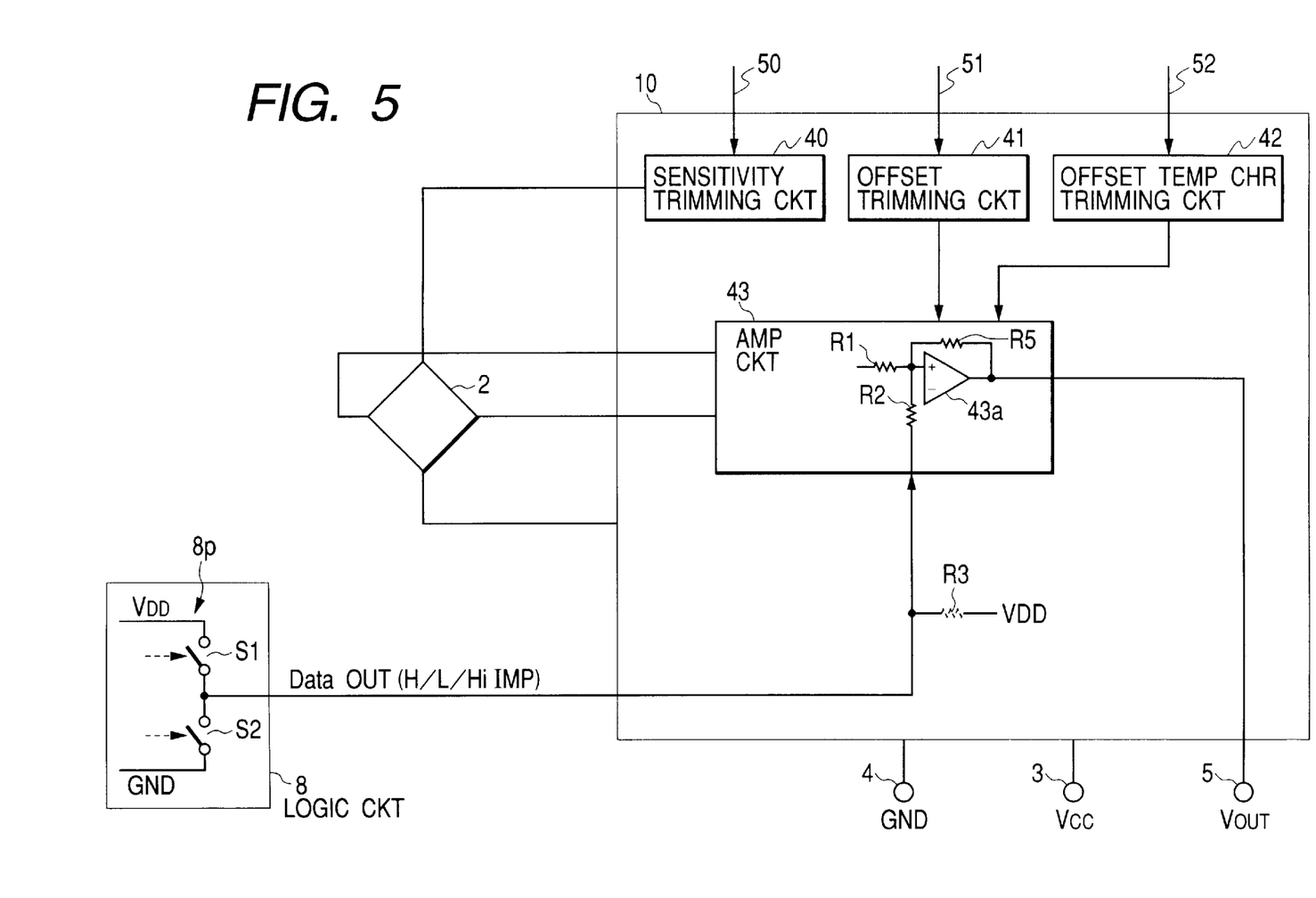
FIG. 5 is a block diagram of the analog circuit shown in FIGS. 1 and 2.

FIG. 5 shows the structure of the analog circuit 10 and a portion of the logic circuit 8. The analog circuit 10 includes a sensitivity trimming circuit 40, an offset trimming circuit 41, and an offset temperature characteristic trimming circuit 42, and an amplifying circuit 43.

The sensitivity trimming circuit 40 adjusts the voltage potential supplied to the bridge 2 to trim the sensitivity in accordance with the sensitivity trimming voltage 50 from the trimming voltage control circuit 9.

The offset trimming circuit 41 adjusts the offset voltage in the bridge 2 by controlling the amplifying circuit 43 in accordance with the offset trimming voltage 41 from the trimming voltage control circuit 9.

The offset temperature characteristic trimming circuit 42 adjusts the offset temperature characteristic by controlling the amplifying circuit 43 in accordance with the offset temperature characteristic trimming voltage 42 from the trimming voltage control circuit 9.

The output Data OUT from the logic circuit 8 is of a tri-state signal, that is, a logic Hi, a logic Low, and a high impedance state. More specifically, the output circuit 8p of the logic circuit 8 includes a switch S1 for selectively outputting a logic Hi level at the Data OUT and a switch S2 for selectively outputting a logic Hi level at the Data OUT. Thus, when both switches S1 and S2 are open, the Data OUT is in the high impedance state.

The Data OUT signal is supplied to an inverting input of an output amplifier 43a in the amplifying circuit 43 through an input resistor R2. When the Data OUT signal is in the high impedance, the voltage signal from the bridge 2 is outputted at the Vout terminal 5. When the Data OUT signal is in the logic Hi level, the amplifier 43a outputs a predetermined voltage level corresponding to the logic Hi level of the Data OUT signal, which is distinguishable from the voltage signal from the bridge 2 at the Vout terminal 5. Moreover, When the Data OUT signal is in the logic Low level, the amplifier 43a may output a predetermined voltage level corresponding to the logic Low level of the Data OUT signal, which is distinguishable from the voltage signal from the bridge 2 at the Vout terminal 5. For example, the resistance of the resistor R2 is determined such that when the Data OUT is in the logic Hi level, the amplifier 43a outputs a possible low voltage level. Thus, if it is assumed that the voltage signal from the bridge 2 ranges from 1 to 2 V at the Vout terminal 5 and the supply voltage VDD is 5 V, the predetermined voltage level corresponding to the logic Hi level at the Data OUT becomes 0.5 V. If the predetermined voltage level corresponding to the logic Low level of the logic circuit 8 should be distinguished from the range of the voltage signal from the bridge 2, a resistor R3 is further connected to shift the voltage range of the voltage signal from the bridge 2.

Thus, when the mode signal indicates to read data from the trimming voltage control circuit 9, the logic circuit 8 receives the data read from the trimming voltage control circuit 9 at an indicated address. If the data indicates that the predetermined voltage level is outputted from the Vout terminal 5, the logic circuit 8 controls the switches S1 and S2. Then, the output amplifier 43a outputs a predetermined voltage level or predetermined voltage levels. Accordingly, the analog circuit 10 outputs either the voltage signal from the sensor circuit 2 or the predetermined voltage level signal defined by the data in the Data OUT at the Vout terminal 5. In other words, the analog circuit 10 outputs a hybrid signal including an analog signal component and a digital signal component which are distinguishable from each other.

This function is provided to check the operation in the logic circuit 8 and the trimming control circuit 9 or the like. More specifically, an external circuit receiving the voltage signal at the Vout terminal 5 can discriminate the voltage signal of the physical sensor circuit 2 from the predetermined voltage level signal. With this discrimination function, inputting test data can check the operation in the logic circuit and the trimming control circuit 9.

The writing voltage VPP is higher than the supply voltage VDD for the signal separation circuit 30, the trimming voltage control circuit 9, and the logic circuit 10. The signal separation circuit 30 includes the diode 14 of which anode is connected to the TRIM terminal 6 and of which cathode is connected to a voltage input of the trimming voltage control circuit 9. The anode of the diode 15 is supplied with the supply voltage VDD and the cathode of the diodes 15 is connected to the voltage input of the trimming voltage control circuit 9 to supply either the supply voltage VDD in the reading operation or the writing voltage VPP in the writing operation.

The separation of the writing voltage VPP from the supply voltage VDD is provided with the diodes 14 and 15. Here, if it is assumed that those diodes are absent, transistors at the high side on the CMOS circuit in the trimming circuit 1 turn on due to operation by parasitic transistors. This results in an erroneous operation of the circuit. That is, the presence of the diodes 14 and 15 avoids such a parasitic operation.

As mentioned above, the TRIM signal is separated into the Clock signal, the Reset signal, the Data IN signal, and the high voltage VPP (a writing voltage or a programming voltage for the memory), so that the number of the input terminals for trimming can be reduced. Moreover, a desired voltage can be selectively outputted at the Vout terminal 5.

Second Embodiment

Figure 6:
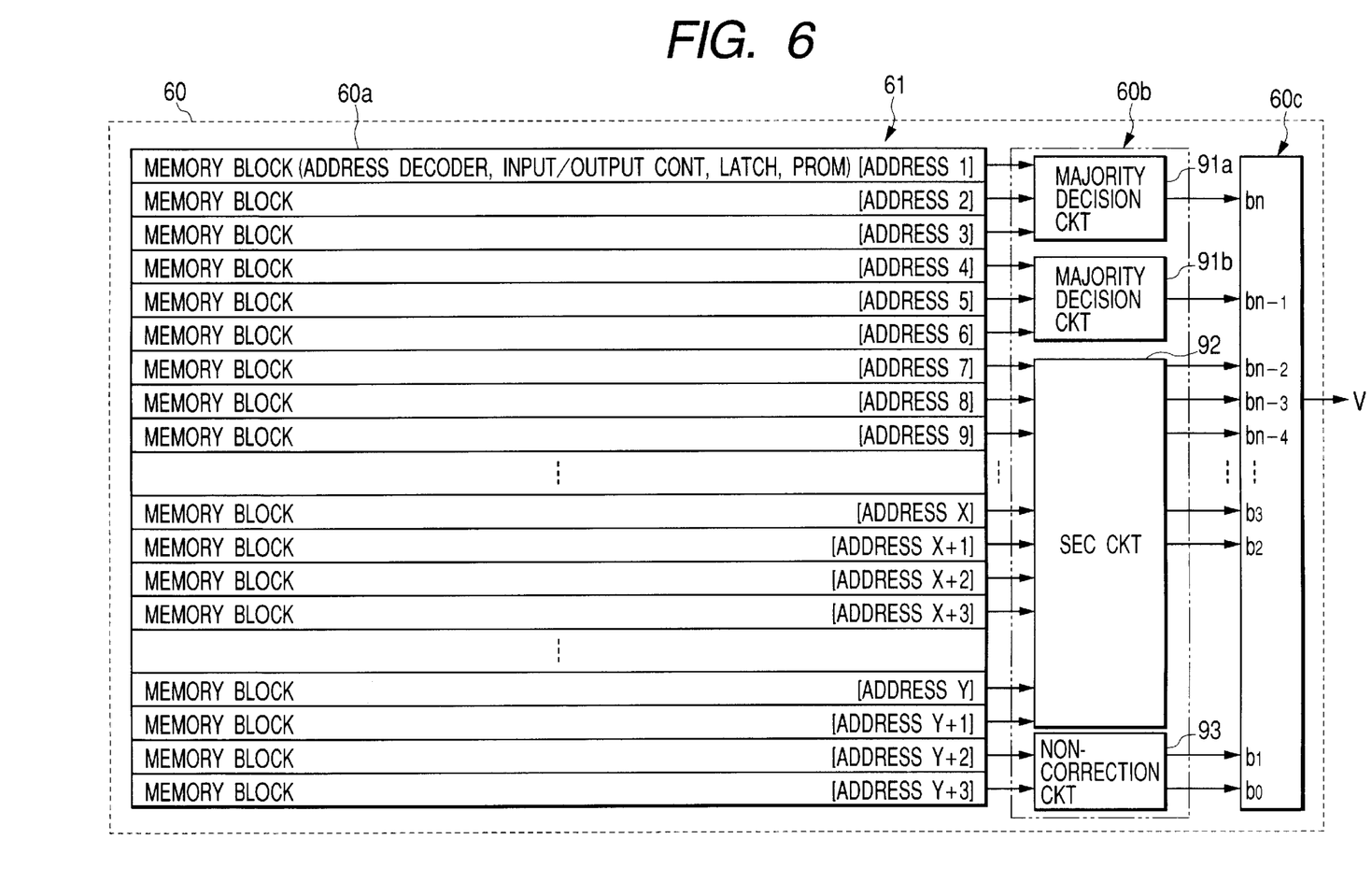
FIG. 6 is a block diagram of a trimming voltage control circuit according to the second embodiment.

The trimming circuit 60 according to the second embodiment has substantially the same structure as that of the first embodiment. The difference is in the error correction circuit in the trimming voltage control circuit 60.

FIG. 6 is a block diagram of the trimming voltage control circuit 60.

The trimming voltage control circuit 60 includes a plurality of memory blocks 60a, an error correction circuit 60b, a D/A converter 60c. Each memory block 60a includes an address decoder, an input/output controller, a latch (volatile memory), and PROM (non-volatile memory). The error correction circuit 60b includes at least one of majority decision circuit circuit, that is, the majority decision circuits 91a and 91b, and at least one of SEC (Single Error Correct) judging circuit 92, and a non-correction circuit 93. The D/A converter 60c converts the data from the error correction circuit 60b into analog voltage signal V. This analog voltage signal is supplied to the analog circuit 10 as a trimming voltage. Here, a plurality of D/A converters 60c may be provided to supply a plurality of trimming voltages to the analog circuit 10.

In the trimming voltage control circuit 9, one of memory block is selected on the basis of address data supplied from the logic circuit 8 through the address bus. Next, the selected memory block 60a receives the mode control signal. In accordance with the mode signal, either of the latch or the PROM is selected. Moreover, the writing or reading mode is selected on the basis of the data.

In the reading mode, the read data is supplied to the error correction circuit 60b where error correction is made.

The majority decision circuit 91a is supplied with three pieces (units) of data from the memory blocks having addresses 1 to 3, wherein the same data is stored in these memory blocks to provide the majority decision. The majority decision circuit 91a makes majority decision from these three pieces of data. When more than one pieces of data indicates "0", the majority decision circuit 91a output "0", and when more than one pieces of data indicates "1", the majority decision circuit 91a outputs "1". Thus, though one bit of data is erroneously stored or read, the error is corrected. The output of the majority decision circuit 91a is supplied to the D/A converter 60c as the highest bit. The majority decision circuit 91b supplies the second highest bit to the D/A converter 60c with error correction by the majority decision judgment.

The D/A converter 60c converts the corrected data into the analog voltage signal V as the trimming voltage.

The D/A converter 60 is supplied with the highest bit from the majority decision circuit 91a at an input $b_n$ and with the second highest bit from the majority decision circuit 91b at an input $b_{n-1}$. The lower bits are supplied from the SEC circuit 92 to the A/D converter at input $b_{n-2}$ to $b_2$. The lowest and the second lowest bits are supplied from the non-correction circuit 93 to the A/D converter 60c at inputs $b_o$ and $b_1$. Thus, the output of the majority decision circuit 91a is weighted with the highest coefficient by the A/D converter 60c. The output of the majority decision circuit 91b is weighted with the second highest coefficient by the A/D converter 60c. That is, the error correction is made for the data having higher priority by the majority decision circuits 91a and 91b to provide a surer error correction. However, the input-per-output bit efficiency is low because three memory blocks at addresses 1 to 3 are used for one output bit. On the other hand, the error correcting capability is highest.

The lower bits are supplied from the SEC circuit which effects a SEC operation to the data read from the memory circuit 61. The SEC circuit 92 outputs data with error correction with error correction data from the memory circuit 61. Thus, the error correction is made for the data having priorities which are lower than data from the majority decision circuit 91a and 91b. The input-per-output bit efficiency is higher than that in the majority decision circuit 91a and 91b because only m bits of parity bits ($A_{n+1}$ to $A_{n+m}$) are added to N bit of data stream ($A_1$ to $A_n$), wherein $2^n > (n+m)$. On the other hand, the error correcting capability is lower than that of the majority decision circuit circuits 91a and 91b.

As mentioned above, the bits stored in the memory blocks 60a are weighted with coefficients, wherein each bit is error-corrected by one of the error correction methods which is selected in order of the majority decision, the SEC, and the non-error correction in accordance with the magnitude of the weighting coefficients or priority.

The majority decision circuits 91a and 91b are used for data to be weighted with highest values, for example, the most important data which may cause system halt of the physical quantity sensor. Thus, the data $b_n$ and $b_{n-1}$ have higher reliability than the data from the SEC circuit 92 and the non-error correction circuit 93.

The SEC circuit 92 makes error correction by the SEC method. For example, this operation is provided for important data which may cause decrease in the performance of the physical quantity sensor. This SEC method is generally used in the memory circuits such as DRAMs.

Figure 7:
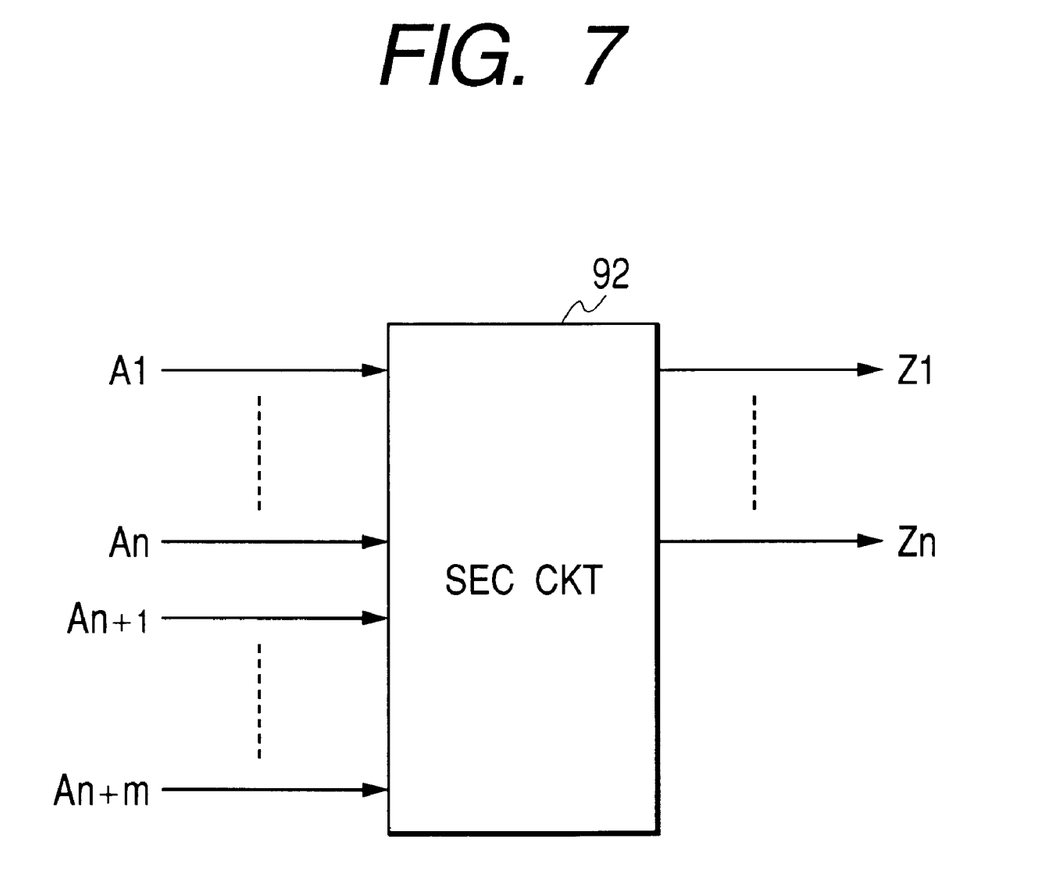
FIG. 7 is a block diagram of the SEC circuit shown in FIG. 6.

FIG. 7 shows the SEC circuit 92. The SEC circuit 92 is supplied with n bits of data stream ($A_1$ to $A_n$) and m bits parity bits ($A_{n+1}$ to $A_{n+m}$), wherein $2^n > n+m$. The SEC circuit 92 outputs $Z_1$ to $Z_n$ from the inputs $A_1$ to $A_n$, wherein the output Z is unchanged though one bit is erroneously stored or read among the inputs $A_1$ to $A_{n+m}$. Thus, single error correction (SEC) is provided.

In the SEC method, there are various designing methods. In this embodiment, the SEC circuit 92 is designed in the condition that n=15 and m=5, and the error correction code is selected from the minimum weighting codes, the even number weighting codes, the cyclic codes or the like.

If it is assumed that the error rate of the memory circuit 62 is 10 ppm, the error rate after the error correction becomes 0.019 ppm. Thus, the data from the SEC circuit 92 to the D/A converter 60c have a reliability which is higher than that from the non-correction circuit 93 although it is lower than that from the majority decision circuits 91a and 91b.

The non-correction circuit 93 supplies the data from the memory circuit 61 to the D/A converter 60b as it is. For example, the non-correction circuit 93 is supplied with the data having a lower importance such as data which causes almost no affection to the physical quantity sensor 2. Thus, the data has a lower reliability than that from the majority decision circuits 91a and 91b and the SEC circuit 92.

Here, it is assumed that the input data to the D/A converter 60c are $b_n$, $b_{n-1}$, . . . , $b_2$, $b_1$, an $b_0$, these binary values are weighted with different coefficients to output the trimming voltage V as follows:

$$V = k_1 \times (b_0 \times 2^0 + b_1 \times 2^1 + \ldots + b_{n-1} \times 2^{n-1}) + k_2$$

where $k_1$ and $k_2$ are constants.

Thus, the error correction method is selected to each bit from the memory circuit 61 in accordance with the magnitude of the coefficient for weighting, that is, the degree of importance of the bit. Accordingly, the reliability of error correction is provided with sufficient input-per-output bit efficiency.

Moreover, the signal separation from the TRIM terminal 6 is also provided in the second embodiment by the signal separation circuit 30.

Modifications

The trimming value control circuit 60 in the second embodiment can be used in the first embodiment.

What is claimed is:

1. A trimming circuit for a physical quantity sensor comprising:
    an analog circuit for effecting at least one of an adjustment operation of a supply voltage to said physical quantity sensor and a trimming operation for an output voltage of said physical quantity sensor in accordance with a trimming value;
    a trimming value control circuit having a memory circuit for storing data and generating said trimming value in accordance with said data from said memory;
    a trimming signal input terminal for inputting a control signal, which include a clock signal, a reset signal, and said data as components;
    a signal separation circuit for separating said clock signal, said reset signal, and said data from said control signal;
    a logic circuit, which responds to said clock signal and said reset signal, for supplying said data from said signal separation circuit to said trimming value control circuit and for receiving said data from said trimming value control circuit;
    a power supply terminal for inputting a driving voltage for said physical quantity sensor;
    a ground terminal;
    an output terminal for outputting a voltage signal corresponding to an output of said physical quantity sensor, wherein said trimming circuit has only four terminals;
    a voltage generation means for generating a predetermined voltage level signal, the level of which is determined on the basis of said data from said logic circuit; and
    a switch response to said data for outputting either of said voltage signal or said predetermined voltage level signal, wherein said predetermined voltage level signal is distinguishable from said voltage signal.

2. The trimming circuit as claimed in claim 1, wherein said control signal further includes a writing voltage for said memory circuit as a component, and said signal separation circuit further separates said writing voltage from said control signal.

3. The trimming circuit as claimed in claim 1,
    wherein said power supply terminal, said ground terminal, and said output terminal are connected to said analog circuit,
    and said logic circuit includes a decoding circuit for decoding said data to generate mode setting data, address data, and control data, and said logic circuit supplies said control data to said trimming value control circuit as said data in accordance with said mode setting data and address data, and
    wherein when said mode setting data indicates a predetermined voltage level signal outputting mode, said logic circuit receives said data from said memory circuit and supplies said received data to said analog circuit and controls said switch to output said predetermined voltage level signal at said output terminal on the basis of said data from said logic circuit.

4. A trimming circuit for a physical quantity sensor comprising:
    an analog circuit for effecting at least one of an adjustment operation of a supply voltage to said physical quantity sensor and a trimming operation for an output voltage of said physical quantity sensor in accordance with a trimming value;
    a trimming value control circuit having a memory circuit for storing data and generating the trimming value in accordance with said data from the memory;
    a trimming signal input terminal for inputting a control signal, which includes a clock signal, a reset signal, and said data as components;
    a signal separation circuit for separating the clock signal, said reset signal, and said data from said control signal; and
    a logic circuit, which responds to said clock signal and said reset signal, for supplying said data from said signal separation circuit to said trimming value control circuit and for receiving said data from said trimming value control circuit, wherein:
    said control signal is represented with first to fourth voltage levels;
    said fourth level is higher than said third voltage level which is higher than said second voltage level which is higher than said first voltage level;
    and wherein said logic circuit effects a reset operation thereof in response to said first voltage level;
    said logic circuit effects a reset releasing operation thereof in response to said second voltage level;
    said logic circuit-receives said second voltage level as a logic low level of said clock signal and a logic low level of said data;
    said logic circuit effects said reset releasing operation of said logic circuit in response to said third voltage level;
    said logic circuit receives said third voltage level as a logic high level of said clock signal, and a logic low level of said data;
    said logic circuit effects said reset releasing operation of said logic circuit in response to said fourth voltage level; and
    said logic circuit receives said fourth voltage level as said logic high level of said clock signal, and a logic high level of said data.

5. A trimming circuit for a physical quantity sensor comprising:
    an analog circuit for effecting at least one of an adjustment operation of a supply voltage to the physical quantity sensor and a trimming operation for an output voltage of the physical quantity sensor in accordance with a trimming value;
    a trimming value control circuit having a memory circuit for storing data and generating the trimming value in accordance with the data from the memory;
    a trimming signal input terminal for inputting a control signal, which includes a clock signal, a reset signal, and said data as components;
    a signal separation circuit for separating the clock signal, the reset signal, and the data from the control signal;
    a logic circuit, which responds to the clock signal and the reset signal, for supplying the data from the signal separation circuit to the trimming value control circuit and for receiving the data from the trimming value control circuit, wherein:

the control signal includes a writing voltage for said memory circuit as a component, and the signal separation circuit separates the writing voltage from the control signal;

the writing voltage is higher than a supply voltage for said signal separation circuit, said trimming voltage control circuit, and said logic circuit, and wherein said signal separation circuit includes:
first and second diodes for supplying either said supply voltage or said writing voltage;
an anode of said first diode being connected to said trimming signal input terminal;
a cathode of said first diode being connected to a voltage input of said trimming voltage control circuit;
an anode of said second diode being supplied with said supply voltage; and
a cathode of said second diodes being connected to said voltage input of said trimming voltage control circuit.

6. A trimming circuit for a physical quantity sensor comprising:

an analog circuit for effecting at least one of an adjustment operation of a supply voltage to said physical quantity sensor and a trimming operation for an output voltage of said physical quantity sensor in accordance with a trimming value;

a trimming value control circuit having a memory circuit for storing data and generating said trimming value in accordance with said data from the memory;

a trimming signal input terminal for inputting a control signal, which includes a clock signal, a reset signal, and said data as components;

a signal separation circuit for separating said clock signal, said reset signal, and said data from said control signal;

a logic circuit, which responds to said clock signal and said reset signal, for supplying said data from said signal separation circuit to said trimming value control circuit and for receiving said data from said trimming value control circuit, wherein said memory circuit includes a plurality of memory blocks for storing said data including first and second data, each of said memory blocks including a memory; and said trimming value control circuit comprises:

a first error correction circuit for error-correcting said first data from said memory circuit through a first error correcting method;

a second error correction circuit for error-correcting said second data from said memory circuit through a second error correcting method, said first error correcting method being different from said second error correcting method; and a weighting circuit for weighting an output of said first error correction circuit with a first coefficient to output a first trimming value and an output of said second error correction circuit with a second coefficient to output a second trimming value, said first coefficient being higher than said second coefficient, said logic circuit supplying said first and second trimming values as said trimming value to said analog circuit.

7. The trimming circuit as claimed in claim 6, wherein said first error correcting circuit has a first input-per-output bit efficiency, and said second error correction circuit has a second input-per-output bit efficiency which is higher than said first input-per-output bit efficiency.

8. The trimming circuit as claimed in claim 6, wherein said first error correction circuit has a first error correcting capability, and said second error correction circuit has a second error correcting capability which is lower than said first error correcting capability.

9. The trimming circuit as claimed in claim 6, wherein said first error correcting circuit comprises a majority decision circuit for making majority decisions from said first data stored in a portion of said memory blocks.

10. The trimming circuit as claimed in claim 6, wherein said data includes error correction data, and said second error correction circuit corrects said second data from said memory circuit with said error correction data from said memory circuit.

11. A trimming circuit for a physical quantity sensor comprising:

a memory circuit including a plurality of memory blocks for storing data including first and second data, each of said memory blocks including a memory;

a first error correction circuit for error-correcting said first data from said memory circuit through a first error correcting method;

a second error correction circuit for error-correcting said second data from said memory circuit through a second error correcting method, said first error correcting method being different from said second error correcting method; and a weighting circuit for weighting an output of said first error correction circuit with a first coefficient to output a first trimming value for said physical quantity sensor and an output of said second error correction circuit with a second coefficient to output a second trimming value for said physical quantity sensor, said first coefficient being higher than said second coefficient.

12. The trimming circuit as claimed in claim 11, wherein said first error correcting method has a first input-per-output bit efficiency and said second error correcting method has a second input-per-output bit efficiency which is higher than said first input-per-output bit efficiency.

13. The trimming circuit as claimed in claim 11, wherein said first error correcting method has a first error correcting capability, and said second error correcting method has a second error correcting capability which is lower than said first error correcting capability.

14. The trimming circuit as claimed in claim 11, wherein said data further includes error correction data, and said first error correcting circuit comprises a majority decision circuit for making majority decision from said first data from a portion of said memory blocks, and wherein said second error correction circuit error-corrects said second data from said memory circuit with said error correction data from said memory circuit.

15. The trimming circuit as claimed in claim 11, wherein said data further includes third data, and said trimming value control circuit comprising a non-error-correction circuit for outputting said third data from said memory circuit as it is, wherein said weighting circuit weights an output of said non-error-correction circuit with a third coefficient which is lower than said second coefficient.

16. The trimming circuit as claimed in claim 15, wherein said first data has a higher priority than that of said second data and said second data has a higher priority than that of said third data.

17. The trimming circuit as claimed in 11, further comprising:
an analog circuit for effecting at least one of operations of adjustment of a supply voltage to said physical quantity sensor and trimming for an output voltage of said physical quantity sensor in accordance with said first and second trimming values;
a trimming signal input terminal for inputting a control signal, which includes a clock signal, a reset signal, and said data as components;
a signal separation circuit for separating said clock signal, said reset signal, and said data from said control signal; and
a logic circuit in response to said clock signal and said reset signal for supplying said data from said signal separation circuit to said memory circuit as said first and second data to supply said trimming value from said trimming value control circuit to said analog circuit.

18. A trimming circuit for a physical quantity sensor comprising:
an analog circuit for effecting at least one of operations of adjustment of a supply voltage to said physical quantity sensor and trimming for an output voltage of said physical quantity sensor in accordance with a trimming value;
a trimming value control circuit having a memory circuit for storing data including first and second data and generating said trimming value in accordance with said data;
a logic circuit for supplying said data to said trimming value control circuit and for receiving said data from said trimming value control circuit, wherein said memory circuit including a plurality of memory blocks, each including a memory; and said trimming value control circuit comprises:
a first error correction circuit for error-correcting said first data from said memory circuit through a first error correcting method;
a second error correction circuit for error-correcting said second data from said memory circuit through a second error correcting method, said first error correcting method being different from said second error correcting method; and
a weighting circuit for weighting an output of said first error correction circuit with a first coefficient to output a first trimming value and an output of said second error correction circuit with a second coefficient to output a second trimming value, said first coefficient being higher than said second coefficient, said logic circuit supplying said first and second trimming values as said trimming value to said analog circuit.

19. The trimming circuit as claimed 18, wherein said data further includes third data, and said trimming value control circuit comprising a non-error-correction circuit for outputting said third data from said memory circuit as it is, wherein said weighting circuit weights an output of said non-error-correction circuit with a third coefficient which is lower than said second coefficient.

20. The trimming circuit as claimed in claim 18, wherein said first data has a higher priority than that of said second data, and said second data has a higher priority than that of said third data.

21. The trimming circuit as claimed in claim 18, wherein said first error correcting method has a first input-per-output bit efficiency and said second error correcting method has a second input-per-output bit efficiency which is higher than said first input-per-output bit efficiency.

22. The trimming circuit as claimed in claim 18, wherein said first error correcting method has a first error correcting capability, and said second error correcting method has a second error correcting capability which is lower than said first error correcting capability.

23. The trimming circuit as claimed in claim 18, further comprising:
a trimming signal input terminal for inputting a control signal, which includes a clock signal, a reset signal, and said data as components; and
a signal separation circuit for separating said clock signal, said reset signal, and said data from said control signal to supply said clock signal, said reset signal, and said data to said logic circuit.

24. The trimming circuit as claimed in claim 23, wherein said control signal further includes a writing voltage for said memory circuit as a component, and said signal separation circuit further separates said writing voltage from said control signal.

* * * * *